United States Patent Office 2,730,017
Patented Jan. 10, 1956

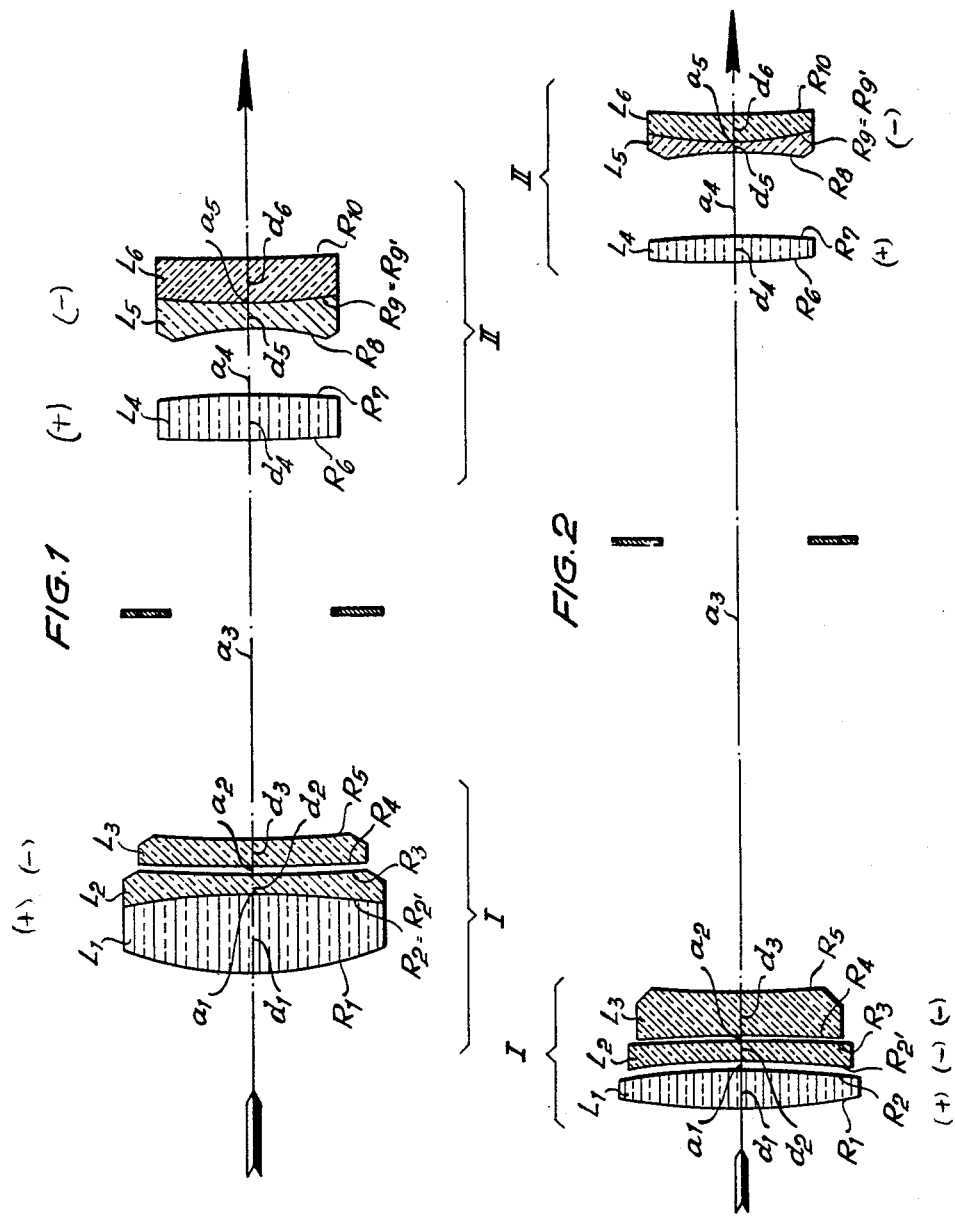

2,730,017

PHOTOGRAPHIC TELE-OBJECTIVE HAVING THREE LENS COMPOSITE FRONT AND REAR MEMBERS

Albrecht Wilhelm Tronnier, Gottingen, Germany, assignor to Voigtländer, A. G., Braunschweig, Germany, a corporation of Germany Application October 6, 1954, Serial No. 460,687

Claims priority, application Germany November 23, 1953

12 Claims. (Cl. 88—57)

This invention relates to photographic tele-objectives and it has particular relation to tele-objectives of high light-transmitting capacity, in which the paraxial back focal length for the remote object is smaller than half of the equivalent focal length of the objective.

Objectives of this type are fundamentally built in such manner that a composite front member of positive total refractive power, which is turned toward the major conjugate, is separated by a large air space from a likewise composite rear member located on the side of the minor conjugate and having a diverging total refractive power, whereby the diaphragm is in general arranged in said large air space. The telephoto effect, i. e. the reciprocal value of the ratio of the paraxial back focal length to the total focal length, amounts in such systems to about 2.0 and in some more recent tele-objectives to about 2.5 and higher.

The tele-objectives known from the prior art are in general built in such manner that not only the diverging rear member—usually denoted tele-negative—but also the positive front member is composed of several lenses. According to the prior art preferably front members consisting of two lenses are used, which either belong to the Fraunhofer type and are composed of a biconvex converging lens and a diverging lens of unequal curvature, or belong to the Gauss type and are then composed of a converging meniscus and a diverging meniscus.

In these objectives of the prior art, in some cases one of the converging lenses or one of the diverging lenses of the positive part of the objective, consists of a cemented member, particularly in order to adapt chromatic correction of these known lens systems to the requirements of practical photography, especially in objectives having a telephoto effect distinctly exceeding 2.

The known objective systems of the above mentioned type, which include a front member consisting of three lenses, mostly contain two converging lenses which enclose an extremely strongly diverging negative lens of the front member. One of these two converging lenses is mostly a positive meniscus in order to keep the Petzval sum low, although this effect can be easily obtained in other manner in tele-objectives, in view of the negative refractive power of the rear member.

The use of an extremely strongly diverging negative lens between two converging lenses of the front member of these tele-objectives, causes, in general, on account of the resulting accumulation of correction effects on only two lens surfaces, considerable increase of zonal aberrations in and outside the axis.

In contrast to the above described objective systems known from the prior art, the tele-objectives embodying the present invention show small zonal aberrations in the apertural defects and, simultaneously, very high telephoto effects. This is attained according to the present invention by providing tele-objectives of high light-transmitting capacity with a three-lens front member, in which a biconvex converging lens is followed, in the direction of light, by two adjacent diverging lenses of preferably unequal curvature, having an overcorrection effect. Thereby, the four surfaces of these two diverging lenses serve as carriers of partial correction effects in the objective front member, the biconvex front lens of which has a proper focal length, which is higher than 22.5%, but lower than 47.5% of the equivalent focal length of the total objective. According to the invention, the front member of the objective is separated from the conventional tele-negative of the objective by an air space, the width of which, measured along the optical axis, amounts to at least 20% and a maximum of 60% of the equivalent focal length of the objective.

Objectives built according to the principle of the present invention have telephoto effects exceeding 4. In carrying out the invention many modifications are possible, in which specific, structural simplifications can be made in objectives having lower telephoto effects.

The Figures 1 and 2 of the appended drawings and the following tables illustrate in detail two tele-objectives according to the invention, said two objectives having different structures and high, but likewise different, telephoto effects. According to the first example, in the three-lens front member, the biconvex front lens of unequal curvature, the paraxial proper focal length of which amounts to 27.9% of the equivalent focal length of the total objective, is followed, in the direction of light, by two characteristic, adjacent diverging lenses of unequal curvature, in such manner that the two diverging lenses enclose a meniscus-shaped air space which is convex toward the major conjugate.

In Example 2, which illustrates a tele-objective of high light-transmitting capacity having a tele-photo effect exceeding 4, the biconvex front lens, the proper focal length of which amounts to 35.9% of the equivalent focal length of the total objective, is followed, in the direction of light, by two characteristic diverging lenses, in such manner, that said front lens is separated from the diverging lenses by an air lens which is concave toward the major conjugate.

In the drawings, as well as in the tables, the radii of curvature ($R_1$, $R_2$, etc.), the thicknesses of lenses ($d_1$, $d_2$, etc.), the thicknesses of the air spaces between lenses ($a_1$, $a_2$, etc) and the individual lenses ($L_1$, $L_2$, etc.) are consecutively numbered starting on the side of the major conjugate, toward the side of the minor conjugate. The glasses of the individual lenses are characterized by their refractive indices ($n_1$, $n_2$, etc.) for the yellow light of the $d$-line of the helium spectrum, while their color dispersion is characterized by the Abbe number ($v_1$, $v_2$, etc.), these symbols being numbered in the beforementioned order. The paraxial back focal length of the objective is denoted $p_0'$.

While in Figures 1 and 2, the objectives are drawn to scale for an equivalent focal length of f=300 mm., the numerical values in the tables refer to a focal length of the objective of f=100 mm.

Example 1 illustrates an objective having a telephoto effect of 2.69 and one of the above mentioned structural simplifications, according to which adjacent surfaces $R_2$ and $R'_2$ of the two lenses turned toward the major conjugate have equal radii and are united to a cemented surface.

According to the simplification illustrated in Example 2, the same glass is used in lenses $L_2$, $L_3$ and $L_6$.

In both examples, diverging rear member II belongs to the more recent structural design which corresponds to the Fraunhofer type in the design of its lenses.

In both objectives, the three-lens front member I is separated from the composite rear member having a diverging total effect, by an air space, the width of which, measured along the optical axis, amounts to 25.8% in Example 1 and 47.0% in Example 2, of the equivalent focal length of the total objective, and is thus higher than 20% of said equivalent focal length without exceeding 60% of the same.

The structural design of the new tele-objectives according to the invention is preferably characterized by the following ranges of the radii of curvature of the lenses forming the three-lens front member I:

$$0.18\ f < R_1 < 0.48\ f$$
$$0.36\ f < -R_2 < 0.72\ f$$
$$0.36\ f < -R'_2 < 0.72\ f$$
$$0.8\ f < \pm R_3 < \infty$$
$$0.8\ f < \pm R_4 < \infty$$
$$0.5\ f < \pm R_5 < \infty$$

Furthermore, the proper focal length of converging lens $L_1$ meets the condition $$0.255\ f < f_{0_I} < 0.475\ f$$

and the width of the diaphragm space meets the condition $$0.2\ f < a_3 < 0.6\ f$$

Example 1

[$f = 100$ mm.   1:4.5   $p_0' = 37.203$]

| | | | |
|---|---|---|---|
| $R_1 = +\ 24.288$ | $d_1 = 5.183$ | $n_1 = 1.58987$ | $\nu_1 = 61.2$ |
| $R_2 = -\ 47.056$ | $a_1 = 0$ cemented | | |
| I $\{$ $R_2' = -\ 47.056$ | $d_2 = 1.382$ | $n_2 = 1.72381$ | $\nu_2 = 38.0$ |
| $R_3 = +240.306$ | $a_2 = 0.494$ | air | |
| $R_4 = +177.947$ | $d_3 = 1.185$ | $n_3 = 1.72381$ | $\nu_3 = 38.0$ |
| $R_5 = +\ 75.934$ | $a_3 = 25.819$ | diaphragm space | |
| $R_6 = +\ 92.523$ | $d_4 = 2.814$ | $n_4 = 1.62355$ | $\nu_4 = 47.0$ |
| $R_7 = -116.367$ | $a_4 = 4.305$ | air | |
| $R_8 = -\ 17.229$ | $d_5 = 1.728$ | $n_5 = 1.58192$ | $\nu_5 = 40.8$ |
| II $\{$ $R_9 = +\ 40.117$ | $a_5 = 0$ cemented | | |
| $R_9' = +\ 40.117$ | $d_6 = 2.962$ | $n_6 = 1.75512$ | $\nu_6 = 27.5$ |
| $R_{10} = -199.480$ | | | |

Lens $L_1$ has a proper focal length of $f_{0_I} = 27.910$ mm. The telephoto effect amounts to 2.69.

Example 2

[$f = 100$ mm.   1:4.7   $p_0' = 22.641$]

| | | | |
|---|---|---|---|
| $R_1 = +\ 38.332$ | $d_1 = 2.608$ | $n_1 = 1.61375$ | $\nu_1 = 56.3$ |
| $R_2 = -\ 50.342$ | $a_1 = 0.669$ | air | |
| I $\{$ $R_2' = -\ 48.797$ | $d_2 = 1.204$ | $n_2 = 1.67326$ | $\nu_2 = 32.2$ |
| $R_3 = -163.664$ | $a_2 = 0.201$ | air | |
| $R_4 = -100.697$ | $d_3 = 3.176$ | $n_3 = 1.67326$ | $\nu_3 = 32.2$ |
| $R_5 = +2046.972$ | $a_3 = 47.011$ | diaphragm space | |
| $R_6 = +\ 52.963$ | $d_4 = 1.705$ | $n_4 = 1.51566$ | $\nu_4 = 54.6$ |
| $R_7 = -\ 99.119$ | $a_4 = 5.517$ | air | |
| $R_8 = -\ 25.947$ | $d_5 = 0.602$ | $n_5 = 1.66894$ | $\nu_5 = 47.1$ |
| II $\{$ $R_9 = +\ 21.406$ | $a_5 = 0$ cemented | | |
| $R_9' = +\ 21.406$ | $d_6 = 1.705$ | $n_6 = 1.67326$ | $\nu_6 = 32.2$ |
| $R_{10} = +\ 150.651$ | | | |

Lens $L_1$ has a proper focal length of $f_{0_I} = 35.858$ mm. The telephoto effect amounts to 4.41.

It will be understood that this invention is not limited to the specific designs, figures, optical values and other specific details described above and illustrated in the drawings and can be carried out with various modifications without departing from the scope of the invention as defined in the appended claims.

What is claimed is:

1. Tele-objective of high light-transmitting capacity comprising a composite front member and a composite rear member which are separated by a large air space; the composite front member, which is turned toward the side of the major conjugate having a converging effect, while the composite rear member, which is located on the side of the minor conjugate, consists of a tele-negative system comprising three lenses, i. e. a biconvex converging lens and a negative lens member air-spaced therefrom and having outer surfaces of unequal curvature, of which the most strongly diverging surface is concave relative to the front system, the diaphragm and said preceding biconvex converging lens, said air-spaced negative lens member consisting of 2 lenses made of glasses of differing dispersions, for obtaining a high chromatic correction; the width of said air space, measured along the optical axis, amounting to at least 20%, but not more than 60% of the focal length of the total objective; the converging composite front member being composed of three lenses in such manner that the first lens of the front member, in the direction of the light, is a biconvex lens, the proper focal length of which amounts to at least 22.5%, but not more than 47.5% of the equivalent focal length of the total objective, and said first lens is followed, in the direction of light, by two adjacent diverging lenses.

2. A tele-objective as claimed in claim 1, in which each of the two adjacent diverging lenses of the composite front member is of unequal curvature.

3. A tele-objective as claimed in claim 1, in which the diverging composite rear member of the objective has a structural design of the Fraunhofer type, in which a biconvex converging lens is followed in the direction of light by a diverging lens element of unequal curvature, this diverging lens element having its diverging outer hollow surface of strongest curvature, turned toward said biconvex converging lens.

4. A tele-objective as claimed in claim 1, in which in the three-lens composite front member the first biconvex lens is followed, in the direction of light, by two diverging lenses in such manner that a meniscus-shaped air space, which is convex toward the side of the major conjugate, is enclosed between said two diverging lenses.

5. A tele-objective as claimed in claim 1, in which in the three-lens composite front member the first biconvex lens is followed, in the direction of light, by two diverging lenses of unequal curvature, in such manner that a meniscus-shaped air space, which is convex toward the side of the major conjugate, is enclosed between said two diverging lenses.

6. A tele-objective as claimed in claim 1, in which in the three-lense composite front member, a biconvex front lens of unequal curvature is followed, in the direction of light, by two diverging lenses of likewise unequal curvature in such manner, that an air lens which is concave toward the major conjugate, is enclosed between said two diverging lenses.

7. Tele-objective of high light-transmitting capacity, as claimed in claim 1, in which the adjacent surfaces of the first and second lens, in the direction of light, of the converging composite front member have equal radii of curvature and are united to a common cemented surface.

8. A tele-objective of high light-transmitting capacity, as claimed in claim 1, in which the radii of curvature of the converging three-lens front member of the objective are in the following ranges:

$$0.18\ f < R_1 < 0.48\ f$$
$$0.36\ f < -R_2 < 0.72\ f$$
$$0.36\ f < -R_2' < 0.72\ f$$
$$0.8\ f < \pm R_3 < \infty$$
$$0.8\ f < \pm R_4 < \infty$$
$$0.5\ f < \pm R_5 < \infty$$

the first lens, in the direction of light, of said three-lens front member meeting the condition $$0.225\ f < f_{o_I} < 0.475\ f$$

and the air space separating the composite front member and the composite rear member of the objective meeting the condition $$0.2\ f < a_3 < 0.6\ f$$

wherein f denotes the equivalent focal length of the objective; $R_1$, $R_2$, $R_3$, $R_4$ and $R_5$ denote the radii of curvature of the lens surfaces, consecutively numbered in the direction of light of the composite front member, $f_{o_I}$ stands for the proper focal length of the front lens of the three-lens front member and $a_3$ denotes the width of the air space, measured along the optical axis, separating the composite front member and rear member of the objective.

9. A tele-objective of high light-transmitting capacity, as claimed in claim 1, in which the radii of curvature of the converging three-lens front member of the objective are in the following ranges:

$$0.18\ f < R_1 < 0.48\ f$$
$$0.36\ f < -R_2 < 0.72\ f$$
$$0.36\ f < -R_2' < 0.72\ f$$
$$0.8\ \ f < \pm R_3 < \infty$$
$$0.8\ \ f < \pm R_4 < \infty$$
$$0.5\ \ f < \pm R_5 < \infty$$

the first lens, in the direction of light, of said three-lens front member meeting the condition $$0.225\ f < f_{o_I} < 0.475\ f$$

and the air space separating the composite front member and the composite rear member of the objective meeting the condition $$0.2\ f < a_3 < 0.6\ f$$

wherein f denotes the equivalent focal length of the objective; $R_1$, $R_2$, $R_3$, $R_4$ and $R_5$ denote the radii of curvature of the lens surfaces, consecutively numbered in the direction of light of the composite front member, $f_{o_I}$ stands for the proper focal length of the front lens of the three-lens front member and $a_3$ denotes the width of the air space, measured along the optical axis, separating the composite front member and rear member of the objective; the values of $R_1$, $R_2$, $R_3$, $R_4$, $R_5$, $f_{o_I}$ of the positive front member and $a_3$ being selected as follows (based on f=1):

$$R_1 = +0.25$$
$$R_2 = -0.5$$
$$R_2' = -0.5$$
$$R_3 = +2.5$$
$$R_4 = +1.8$$
$$R_5 = +0.8$$
$$f_{o_I} = 0.28$$
$$a_3 = 0.25$$

10. A tele-objective of high light-transmitting capacity, as claimed in claim 1, in which the radii of curvature of the converging three-lens front member of the objective are in the following ranges:

$$0.18\ f < R_1 < 0.48\ f$$
$$0.36\ f < -R_2 < 0.72\ f$$
$$0.36\ f < -R_2' < 0.72\ f$$
$$0.8\ \ f < \pm R_3 < \infty$$
$$0.8\ \ f < \pm R_4 < \infty$$
$$0.5\ \ f < \pm R_5 < \infty$$

the first lens, in the direction of light, of said three lens front member meeting the condition $$0.225\ f < f_{o_I} < 0.475\ f$$

and the air space separating the composite front member and the composite rear member of the objective meeting the condition $$0.2\ f < a_3 < 0.6\ f$$

wherein f denotes the equivalent focal length of the objective; $R_1$, $R_2$, $R_3$, $R_4$ and $R_5$ denote the radii of curvature of the lens surfaces, consecutively numbered in the direction of light of the composite front member, $f_{o_I}$ stands for the proper focal length of the front lens of the three-lens front member and $a_3$ denotes the width of the air space, measured along the optical axis, separating the composite front member and rear member of the objective; the values of $R_1$, $R_2$, $R_2'$, $R_3$, $R_4$, $R_5$, $f_{o_I}$ of the positive front member and $a_3$ being selected as follows (based on f=1):

$$R_1 = +0.4$$
$$R_2 = -0.5$$
$$R_2' = -0.5$$
$$R_3 = -1.6$$
$$R_4 = -1$$
$$R_5 = +20$$
$$f_{o_I} = 0.36$$
$$a_3 = 0.47$$

11. A tele-objective of high light-transmitting capacity, which meets the following conditions, referred to f=100 mm.:

| | | | |
|---|---|---|---|
| $R_1 = + 24.3$ | $d_1 = 5.2$ | $n_1 = 1.59$ | $\nu_1 = 61$ |
| $R_2 = - 47.1$ | $a_1 = 0$ cemented | | |
| I $\{$ $R_2' = - 47.1$ | $d_2 = 1.4$ | $n_2 = 1.72$ | $\nu_2 = 38$ |
| $R_3 = +240.3$ | $a_2 = 0.5$ | air | |
| $R_4 = +177.9$ | $d_3 = 1.2$ | $n_3 = 1.72$ | $\nu_3 = 38$ |
| $R_5 = + 75.9$ | $a_3 = 25.8$ | diaphragm space | |
| $R_6 = + 92.5$ | $d_4 = 2.8$ | $n_4 = 1.62$ | $\nu_4 = 47$ |
| $R_7 = -116.4$ | $a_4 = 4.3$ | air | |
| II $\{$ $R_8 = - 17.2$ | $d_5 = 1.7$ | $n_5 = 1.58$ | $\nu_5 = 41$ |
| $R_9 = + 40.1$ | $a_5 = 0$ cemented | | |
| $R_9' = + 40.1$ | $d_6 = 3.0$ | $n_6 = 1.76$ | $\nu_6 = 28$ |
| $R_{10} = -199.5$ | | | | the first lens, in the direction of light, of the composite front member of the objective, has a proper focal length of $$f_{o_I} = 27.9$$

wherein $R_1$, $R_2$, $R_2'$ . . . $R_9$, $R_9'$, $R_{10}$ are radii of curvature of the lens surfaces; $d_1$, $d_2$ . . . $d_5$, $d_6$ are thicknesses of the individual glass lens elements, measured along the optical axis; $a_1$, $a_2$ . . . $a_4$, $a_5$ are distances between subsequent lens surfaces, measured along the optical axis; $n_1$, $n_2$ . . . $n_5$, $n_6$ are the refractive indices of subsequent lens elements for the yellow line of the d- line of the helium spectrum, and the color dispersion of these lenses is characterized by their Abbe numbers $\nu_1$, $\nu_2$ . . . $\nu_5$, $\nu_6$, all these values being consecutively numbered in the direction of light.

12. A tele-objective of high light-transmitting capacity, which meets the following conditions referred to f=100 mm.:

| | | | |
|---|---|---|---|
| $R_1 = +38.3$ | $d_1 = 2.6$ | $n_1 = 1.61$ | $\nu_1 = 56$ |
| $R_2 = -50.3$ | $a_1 = 0.7$ | air | |
| I $\{$ $R_2' = -48.8$ | $d_2 = 1.2$ | $n_2 = 1.67$ | $\nu_2 = 32$ |
| $R_3 = -163.7$ | $a_2 = 0.2$ | air | |
| $R_4 = -100.7$ | $d_3 = 3.2$ | $n_3 = 1.67$ | $\nu_3 = 32$ |
| $R_5 = +2047.0$ | $a_3 = 47.0$ | diaphragm space | |
| $R_6 = +53.0$ | $d_4 = 1.7$ | $n_4 = 1.52$ | $\nu_4 = 55$ |
| $R_7 = -99.1$ | $a_4 = 5.5$ | air | |
| II $\{$ $R_8 = -25.9$ | $d_5 = 0.6$ | $n_5 = 1.67$ | $\nu_5 = 47$ |
| $R_9 = +21.4$ | $a_5 = 0$ cemented | | |
| $R_9' = +21.4$ | $d_6 = 1.7$ | $n_6 = 1.67$ | $\nu_6 = 32$ |
| $R_{10} = +150.7$ | | | | the first lens in the direction of light, of the composite front member of the objective has a proper focal length of $$f_{0_I} = 35.9$$

wherein $R_1, R_2, R_2' \ldots R_9, R_9', R_{10}$, are radii of curvature of the lens surfaces; $d_1, d_2 \ldots d_5, d_6$, are thicknesses of the individual glass lens elements, measured along the optical axis; $a_1, a_2 \ldots a_4, a_3$, are distances between subsequent lens surfaces, measured along the optical axis; $n_1, n_2 \ldots n_5, n_6$, are the refractive indices of subsequent lens elements for the yellow line of the d- line of the helium spectrum, and the color dispersion of these lenses is characterized by their Abbe numbers $\nu_1, \nu_2 \ldots \nu_5, \nu_6$, all these values being consecutively numbered in the direction of light.

References Cited in the file of this patent

UNITED STATES PATENTS

| | | |
|---|---|---|
| 1,791,276 | Konig | Feb. 3, 1931 |
| 2,321,973 | Bennett | June 15, 1943 |
| 2,380,207 | Aklin | July 10, 1945 |
| 2,576,436 | Baker | Nov. 27, 1951 |
| 2,662,446 | Tronnier | Dec. 15, 1953 |

FOREIGN PATENTS

| | | |
|---|---|---|
| 316,246 | Germany | Nov. 24, 1919 |